US010136377B1

(12) United States Patent
Narang et al.

(10) Patent No.: US 10,136,377 B1
(45) **Date of Patent: *Nov. 20, 2018**

(54) MOBILE DEVICE HANDOFF OPTIMIZATION

(71) Applicant: Sprint Communications Company L.P., Overland Park, KS (US)

(72) Inventors: Pawankumar C. Narang, Herndon, VA (US); James J. Bae, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/002,023

(22) Filed: Jan. 20, 2016

Related U.S. Application Data

(63) Continuation of application No. 14/026,568, filed on Sep. 13, 2013, now Pat. No. 9,288,724.

(51) Int. Cl.
*H04W 36/00* (2009.01)
*H04W 36/38* (2009.01)
*H04W 12/06* (2009.01)

(52) U.S. Cl.
CPC ......... *H04W 36/385* (2013.01); *H04W 12/06* (2013.01); *H04W 36/0066* (2013.01)

(58) Field of Classification Search
CPC ..................................................... H04W 36/00
USPC .......................................................... 370/331
See application file for complete search history.

(56) References Cited

U.S. PATENT DOCUMENTS 8,868,029 B2 10/2014 Shu et al.
2010/0202450 A1 8/2010 Ansari et al.
2011/0040855 A1* 2/2011 Miklos .................... H04W 8/08 709/220
2011/0051683 A1* 3/2011 Ramankutty ..... H04W 36/0033 370/331
2011/0280218 A1* 11/2011 Huang .................. H04W 12/08 370/331

* cited by examiner

*Primary Examiner* — Brandon Renner
*Assistant Examiner* — Abdeltif Ajid

(57) ABSTRACT

The invention is directed to optimization of a seamless transition of a mobile device from a 3G eHRPD network to a 4G network in a failure scenario. The mobile device is authenticated and attached to the 3G eHRPD network. Upon the mobile device initiating a first handoff attempt to access and access the 4G network, the subscriber profile database is accessed to determine whether a packet gateway identifier is stored on the database. If the identifier is not stored on the database, the first handoff attempt of the mobile device to access the 4G network is denied. Upon being denied, the packet gateway is triggered to communicate the packet gateway identifier in an authorization request so that the identifier can be stored in the subscriber profile database. A subsequent attempt of the mobile device to handoff to the 4G network is allowed, as the packet gateway identifier is now stored on the database.

20 Claims, 4 Drawing Sheets

MOBILE DEVICE HANDOFF OPTIMIZATION

CROSS REFERENCE TO RELATED APPLICATION

This application is a continuation of and claims priority to pending U.S. application Ser. No. 14/026,568 entitled "MOBILE DEVICE HANDOFF OPTIMIZATION," filed on Sep. 13, 2013. The entirety of the aforementioned application is incorporated by reference herein.

SUMMARY

A high-level overview of various aspects of the invention are provided here for that reason, to provide an overview of the disclosure and to introduce a selection of concepts that are further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods to optimize the handoff of a mobile device from a 3G network to a 4G network. In some instances, the packet gateway identifier, which is needed to handoff to the 4G network, is deleted from the subscriber profile database, where the identifier is typically stored. In these instances, the mobile device is denied access to the 4G network, and as such the handoff does not occur. Once the mobile device is denied access, a binding update is communicated to a packet gateway, such as a PGW in the 4G network. This triggers the packet gateway to send an authorization request to the AAA. The authorization request includes the packet gateway identifier associated with the mobile device, which eventually gets sent to the subscriber profile database for storage. A subsequent attempt by the mobile device to handoff to the 4G network will be allowed based on the packet gateway identifier being stored on the subscriber profile database.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
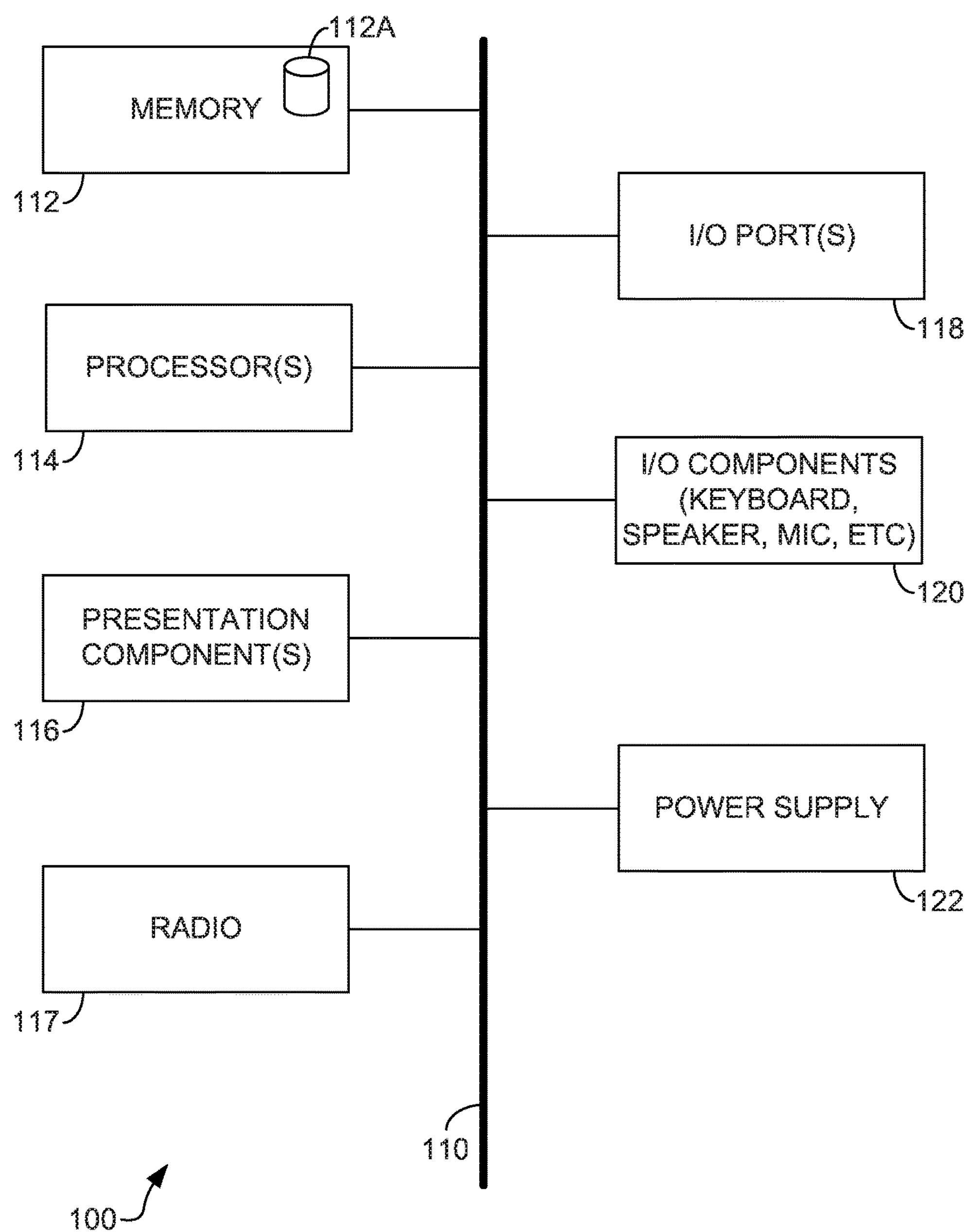
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
BTS Base Transceiver Station
eHRPD Enhanced/Evolved High Rate Packet Data
HA Home Agent
HRPD High Rate Packet Data
HSGW HRPD Serving Gateway
HSS Home Subscriber Server
IEEE Institute of Electrical and Electronics Engineers
IP Internet Protocol
LTE Long Term Evolution
MME Mobility Management Entity
PCRF Policy Charging and Rules Function
PDN Packet Data Network
PDSN Packet Data Serving Node
PMIP Proxy Mobile IPv6
RF Radio Frequency
RNC Radio Network Controller
SGW Serving Gateway
SPS Subscriber Profile System Further, various technical terms are used throughout this description. A definition of such terms can be found in, for example, Newton's Telecom Dictionary by H. Newton, 27th Edition (2013). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As mentioned, embodiments of the present invention are directed toward ensuring that the packet gateway identifier associated with the mobile device's current communication session is stored in the network so that the mobile device can handoff from a 3G network, such as a 3G eHRPD network, to a 4G network, such as a 4G LTE network. In certain instances, the packet gateway identifier is deleted somehow from the subscriber profile database such that the mobile device is denied access to the 4G network, and thus the handoff does not occur, indicating a failure scenario. To prevent this scenario, the first time that the mobile device is denied access to the 4G network because of the deletion of the packet gateway identifier from the subscriber profile database, the packet gateway is triggered to send the packet gateway identifier in an authorization request to the AAA for every Proxy Binding Update (PBU) sent by the service gateway, such as the HRPD Service Gateway (HSGW), which forwards it to the subscriber profile database. This allows the mobile device to access the 4G network the next time it attempts to handoff to the 4G network.

As mentioned, upon the mobile device being denied access to the 4G network, such as a 4G LTE network, the mobile device falls back to the 3G network, such as a 3G eHRPD network, which causes the HSGW to trigger Proxy Binding Update (PBU) handover to PGW. While typically the PDN gateway, according to the 3GPP TS 29.273 standard, does not communicate an authorization request (e.g., AAR), including a PDN identifier, to the Authentication Authorization Accounting (AAA) server as the mobile device is already attached to 3G eHRPD and merely accepts the binding update from the HSGW and continues the session on the 3G network, embodiments described herein provide for the PDN gateway to communicate an authorization request with the PDN identifier to the AAA every time it receives the binding update. The authorization request includes the packet gateway profile, which is communicated to the subscriber profile database by way of the AAA and HSS. A subsequent attempt of the mobile device to access the 4G network will then be allowed, as the packet gateway identifier is now stored on the subscriber profile database.

In a first aspect of the present invention, a method is provided for optimizing a seamless transition of a mobile device from a 3G network to a 4G network in a failure scenario. The method includes authenticating the mobile device to the 3G network, and at a network component, determining that the mobile device is initiating a first handoff attempt to access the 4G network. Also, the method includes accessing a subscriber profile database to determine whether a packet gateway identifier associated with the mobile device is stored on the subscriber profile database, and upon determining that the packet gateway identifier associated with the mobile device is not stored on the subscriber profile database, denying the first handoff attempt by the mobile device to access the 4G network. The method further includes, based on the first handoff attempt by the mobile device to access the 4G network being denied, triggering an authorization request that comprises the packet gateway identifier associated with the mobile device, the packet gateway identifier being forwarded to the subscriber profile database. Additionally, the method includes storing the packet gateway identifier on the subscriber profile database, determining that the mobile device is initiating a second handoff attempt to access the 4G network, and authorizing the second handoff attempt of the mobile device to access the 4G network based on the packet gateway identifier associated with the mobile device being stored on the subscriber profile database.

In a second aspect of the present invention, a method is provided for optimizing a seamless transition of a mobile device from a 3G network to a 4G network in a failure scenario. The method includes receiving an indication that the mobile device is unable to handoff from a 3G Enhanced High Rate Packet Data (eHRPD) network to a 4G Long-Term Evolution (LTE) network based, at least in part, on a subscriber profile database in the 4G LTE network not having stored a packet gateway identifier associated with the mobile device's current communication session. Additionally, the method includes, upon the mobile device not being able to handoff from the 3G eHRPD network to the 4G LTE network, communicating, at a packet gateway, an authorization request that comprises the packet gateway identifier associated with the mobile device's current communication session, the packet gateway identifier being communicated to the subscriber profile database. The method also includes allowing the mobile device to transition from the 3G eHRPD network to the 4G LTE network.

In a third aspect of the present invention, computer-readable media having computer-executable instructions embodied thereon that, when executed, perform a method for optimizing a seamless transition of a mobile device from a non-LTE network to an LTE network in a failure scenario are provided. The method includes, upon determining that a mobile device involved in an existing communications session on the non-LTE network is attempting to handoff to the LTE network, determining that a packet gateway identifier associated with the mobile device is not currently stored in a subscriber profile database. Further, the method includes denying the mobile device access to the LTE network, receiving at a packet gateway a binding update, the binding update triggering the packet gateway to communicate an authorization request, and, at the packet gateway, communicating the authorization request that comprises the packet gateway identifier associated with the mobile device such that the packet gateway identifier is forwarded to and stored on the subscriber profile database. Additionally, the method includes, after a subsequent handoff attempt by the mobile device involved in the existing communications session on the non-LTE network to access the LTE network, allowing the mobile device to access the LTE network based on the subscriber profile database having stored the packet gateway identifier associated with the mobile device.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Component 112A may be an application or code that is stored on device 100 that carries out one or more processes, as described herein. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, LTE, LTE Advanced, HRPD, eHRPD, EVDO, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
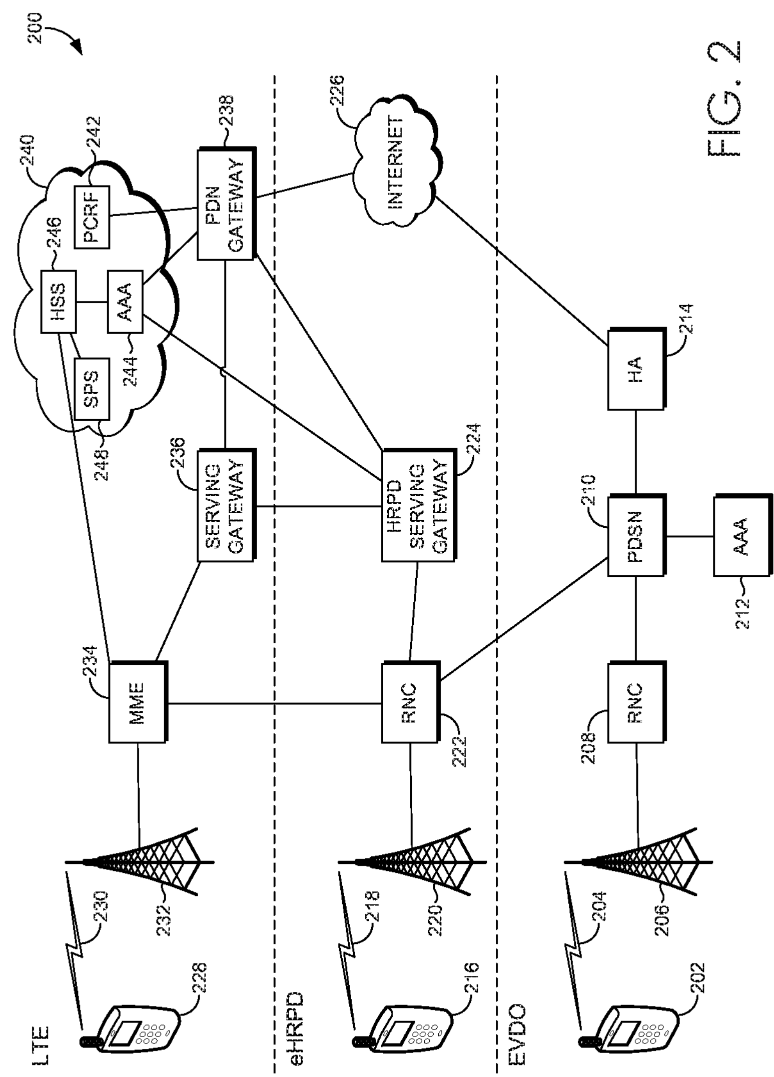
FIG. 2 depicts an illustrative operating system for carrying out embodiments of the present invention.

FIG. 2 depicts an illustrative operating environment, referenced generally by the numeral 200, and illustrates an illustrative networking environment that enables the packet gateway identifier currently associated with a mobile device to be stored in a subscriber profile database so that the mobile device can transition between different networks. The illustrative operating environment 200 shown in FIG. 2 is merely an example of one suitable operating environment and is not intended to suggest any limitation as to the scope of use or functionality of embodiments of the present invention. For example, while EVDO, eHRPD, and LTE networks are illustrated in FIG. 2, other networks not illustrated are contemplated to be within the scope of the present invention. Neither should the operating environment 200 be interpreted as having any dependency or requirement related to any single module/component or combination of modules/components illustrated therein.

Mobile devices 202, 216, and 228, in one embodiment, are the types of device described in connection with FIG. 1 herein. The mobile devices 202, 216, and 228 may support multiple technologies such as CDMA 1×A, GPRS, EvDO, TDMA, GSM, WiMax technology, LTE, LTE Advanced, eHRPD, and the like. Alternatively, the mobile devices 202, 216, and 228 may support one type of technology, such as LTE (LTE and/or LTE Advanced), and more specifically may utilize voice-over LTE (VoLTE) for voice calls. Any and all such aspects, and any combination thereof, are contemplated as being within the scope of the invention. The mobile devices 202, 216, and 228 may include a client application that helps carry out aspects of the technology described herein. The client applications may each be a resident application on the handset used by the mobile device to carry out various aspects of embodiments of the present invention. More specifically, the client applications may allow the mobile devices 202, 216, and 228 to determine when to attempt a handoff to a different network. As used herein, a handoff is the process of transferring an active call or data session from one mobile device in a wireless communications network to another, or from one channel in a mobile device to another. As such, in one embodiment, a handoff describes the scenario when a mobile device transitions from one network to a different network, such as from a 3G network to a 4G network, or from an eHRPD network to an LTE network. Reference to an application, software, or the like, is referring to one or more computer-readable media that are embodied with a set of computer-executable instructions that facilitate various actions to be performed. We will not always include this lengthy terminology because doing so would make this document more difficult to read.

FIG. 2 illustrates three wireless communications networks, including EVDO, eHRPD, and LTE networks, that are interlinked such that a mobile device in any of the networks is able to transition to another network. This may occur when the mobile device moves to location where the nearest base station supports a wireless communications technology different from that of the previously used base station. For instance, when the mobile device moves from 3G to 4G coverage, embodiments of the present invention may be used to ensure the transition takes place. In one instance, a mobile device is unable to transition to a 4G LTE network from a 3G network because the packet gateway identifier, which identifies the packet gateway (e.g., PDN gateway) currently attached or used by the mobile device, is not stored in a subscriber database, where the packet gateway identifier is typically stored. There are many reasons, some unknown, for the packet gateway identifier being initially stored in the subscriber profile database after the mobile device attaches to a network, but then being deleted from the subscriber profile database. The mobile device is unable to transition to the 4G LTE network, for example, without the network having the packet gateway identifier. As such, the subscriber profile database is repopulated with the packet gateway identifier using embodiments described herein so that the mobile device is able to transition from a 3G to a 4G network, for example.

Using embodiments of the present invention, a transition from one network to another (e.g., from 3G eHRPD to 4G LTE) in a failure scenario is a seamless transition. In an embodiment, a seamless transition is one in which the mobile device's Internet Protocol (IP) address does not change when the mobile device hands up from one network to another. Typically, the mobile device's IP address changes if there is a change in network. However, utilizing embodiments of the present invention, the IP address remains the same, and thus the transition is seamless.

As used herein, 3G, or third Generation, is the third generation of mobile telecommunications technology. A 3G network supports services that provide an information transfer rate of at least 200 Kbit/s. 3G technology is used in wireless voice telephony, mobile Internet access, fixed wireless Internet access, video calls, mobile TV, etc. Various standards are branded as 3G. Some of these standards include Universal Mobile Telecommunications System (UMTS) (standardized by 3GPP) (interfaces include W-CDMA, TD-SCDMA, HSPA+) and CDMA2000 (standardized by 3GPP2). Others not typically branded as 3G but are approved as 3G standards include GSM EDGE, DECT, and Mobile WiMAX. Additionally, the first release of 3GPP LTE standard does not completely fulfill the 4G requirements, but is typically branded by 4G. A 3G network, as used herein, refers to any network that is compatible with the 3G standards. However, in one embodiment, a 3G network is a 3G network that utilizes eHRPD, and as such is a 3G eHRPD network.

As used herein, 4G, or fourth Generation, is the fourth generation of mobile phone mobile communication technology standards, and is a successor of 3G standards. A 4G system provides mobile ultra-broadband Internet access, for example, to laptops with USB wireless modems, to smartphones, and to other mobile devices. Exemplary applications include amended mobile web access, IP telephony, gaming services, high-definition mobile TV, video conferencing, 3D television and cloud computing. Two systems have been deployed on 4G. These include Mobile WiMAX, TD-LTE, IEEE 802.16m, Wireless MAN-Advanced, LTE, and LTE Advanced. The speed requirements for 4G are 100 Mbit/s for mobility communication and 1 Gbit/s for low mobility communication. A 4G network, as used herein, refers to any network that is compatible with the 4G standards.

eHRPD is the network shown between EVDO and LTE in FIG. 2. eHRPD allows a service provider to upgrade its existing HRPD packet core network using elements of the System Architecture Evolution (SAE) architecture. eHRPD is a more evolutionary path to LTE while also allowing for seamless service mobility, including seamless hand-offs, between eHRPD and LTE network. As LTE networks are gradually deployed, eHRPD is implemented to transition existing networks, such as EVDO, CDMA, etc., to LTE. As such, many service providers are utilizing eHRPD as a phase migration to LTE, allowing the reuse of elements within the existing 3G packet core network.

Each network illustrated in FIG. 2 operates differently and includes different components. For instance, the EVDO network is shown with a mobile device 202 that may be in communication with a base station via wireless-telecommunications links such as, for example, wireless-telecommunications link 204, which allows for data to be wirelessly communicated between the mobile device 202 and the cell tower 206. The base station, while not illustrated in FIG. 2, may also be referred to herein as the access component. The mobile device 202 may communicate with the access component via the wireless-telecommunications link 204 to facilitate attachment of the mobile device 202 to the network. This allows the mobile device 202 to access the Internet 226, for example. The other components shown in the EVDO network include a radio network controller (RNC) 208, which carries out radio resource management, among other responsibilities. A packet data serving node (PDSN) 210 acts as the connection point between radio access and IP networks. This component is responsible for managing point-to-point protocol (PPP) sessions between the mobile provider's core IP network and the mobile device. The PDSN 210 is similar in function to the GGSN (GPRS Gateway Support Node) that is found in GSM and UMTS networks. The PDSN 210 is in communication with an Authentication Authorization Accounting (AAA) server 212 and a home agent (HA) 214. Because the components of the EVDO network are not able to work directly with components of the LTE network, the eHRPD network, as shown, is implemented to assist with this transition. Other components not illustrated in FIG. 2 in relation to the EVDO network are contemplated to be within the scope of the present invention. These components may not be shown because while they are important to the network itself, they may not be used to carry out embodiments of the present invention.

The mobile device 216 in the eHRPD network may be in communication with a base station via wireless-telecommunications links such as, for example, wireless-telecommunications link 218, which allows for data to be wirelessly communicated between the mobile device 216 and the cell tower 220. This allows the mobile device 216 to access the Internet 226, for example. The RNC 222 communicates with various components in the other network, and also communicates with an HRPD serving gateway (HSGW) 224. In one embodiment, the HSGW 224 ensures converged mobility management between HRPD and LTE networks. The HSGW 224 provides interworking between the HRPD access node and the PDN gateway 238 in the LTE network. Other components not illustrated in FIG. 2 in relation to the eHRPD network are contemplated to be within the scope of the present invention. These components may not be shown because while they are important to the network itself, they may not be used to carry out embodiments of the present invention.

The LTE network is shown with a mobile device 228 that is in communication with the network. The mobile device may be in communication with a base station via wireless-telecommunications links such as, for example, wireless-telecommunications link 230, which allows for data to be wirelessly communicated between the mobile device 228 and the cell tower 232. This allows the mobile device 228 to access the Internet 226, for example. As mentioned, an eNodeB is used in an LTE network. Besides being in communication with the mobile device 228, the eNodeB in an LTE network and the cell tower 232 are also in communication with other network nodes such as the Mobility Management Entity (MME) 234 and the Serving Gateway (SGW) 236. The MME 234 is a control node in the LTE network. It is responsible for, among other things, mobile device tracking and paging procedures, authenticating the mobile device 228, and acting as the control point for the transfer of the mobile device between LTE channels. In embodiments described herein, the MME 234 may query other network components, such as the HSS 246, for the packet gateway identifier that is stored in a subscriber profile database, such as the Subscriber Profile System (SPS) 248. The SGW 236 routes and forwards user data packets. It also acts as the mobility anchor for the user plane during inter-eNodeB handovers, and as the anchor for mobility between LTE and other 3GPP technologies.

Another component in the LTE network illustrated in FIG. 2 is the PDN Gateway (PGW) 238. The PGW 238 provides connectivity from the mobile device 228 to external packet data networks by being the point of exit and entry of traffic for the mobile device 228. Generally, the PGW 238 performs policy enforcement, packet filtering, charging support, packet screening, and the like. The PGW 238 may act as the anchor for mobility between 3GPP and non-3GPP technologies. In embodiments described herein, the PGW 238 is triggered to send an authorization request to the AAA 244, the authorization request including the packet gateway identifier, which is needed to transition a mobile device from a non-LTE network to the LTE network. While LTE is the network illustrated in FIG. 2, other networks, such as LTE Advanced may also benefit from described embodiments of the present invention.

Other network components shown in FIG. 2 are those shown within the authentication/security network 240, and include the Policy Charging and Rules Function (PCRF) 242, the AAA server 244, the HSS 246, and the SPS 248. The PCRF 242 determines policy rules in the network. The AAA server 244 is responsible for various aspects of authentication, authorization, and accounting. In embodiments described herein, the AAA server 244 receives an authorization request from the PGW 238, wherein the authorization request includes the identifier of the packet gateway or PGW. As mentioned, this identifier is needed for a mobile device to handoff or otherwise move from a non-LTE network to the LTE network, such as from 3G to 4G. The AAA server 244 then forwards the packet gateway identifier to the HSS 246, which forwards it to the SPS 248 where it is stored. As such, the SPS 248 is repopulated with the packet gateway identifier.

The HSS 246 is a central data store that contains user-related and subscription-related information. The HSS 246 is utilized for user authentication and access authorization. The SGW 236 routes and forwards data packets, while the PGW 238 provides connectivity from the mobile device 228 to external data packet networks (i.e., the Internet 226) by being the point of exit and entry of data traffic for the mobile device 228. As mentioned, the network may include additional components other than those shown. Further, the components shown in FIG. 2 may carry out additional functions besides those described. The discussion of the network is meant to illustrative only and is provided as an aid in understanding embodiments of the invention.

Returning to FIG. 2 in general, the access components (shown in FIG. 2 as cell towers 206, 220, 232) typically provide access to what some skilled artisans refer to as a wireless communications network, also termed a core network. A wireless communications network may comprise one or more of the components illustrated in FIG. 2, including the cell tower (items 206, 220, 232), the access component or base stations, RNCs (items 208, 222), gateways, etc. To the contrary, not all components that make up a wireless communications network are shown. Also, not all connections or possible connections are shown. The access component may be one or more of a base transceiver station (BTS) tower, eNodeB, a Wi-Fi Router, a Mobile Hotspot, and any other device that facilitates communication between mobile device and the network. For example, if the wireless communications system utilizes LTE technology, the access component would be termed eNodeB. In one embodiment, the access component includes both a Wi-Fi Router and a BTS tower. In another embodiment, access component is a BTS tower. While in FIG. 2 the access components are shown as cell towers, other components may be necessary to provide the functionality of an access component described above.

A radio network controller (RNC) (items 208 and 222), as described above, performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) and handles allocation of radio channels, receives measurements from mobile devices, and controls handovers from one BTS to another BTS. The hardware associated with the access components may include, for example, the actual radio mast or tower (items 206, 220, 232), as well as antennas, transceivers, GPS receivers, electrical power sources, digital signal processors, control electronics, and the like that are associated with the radio tower.

Wireless-telecommunications links 204, 218, and 230 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, and 802.16.

Embodiments of the present invention may be used with different technologies or standards, such as, for example, CDMA, 1×A, EVDO, HRPD, eHRPD, LTE, and LTE Advanced. Other technologies and standards not listed herein are also contemplated to be within the scope of the present invention.

In one exemplary embodiment, a mobile device, such as mobile device 216 in the 3G eHRPD network may attempt to access the 4G LTE network. This may happen when the mobile device 216 enters an area that has 4G LTE coverage, such as where a cell tower 232 is located. When the mobile device 216 makes this attempt, the MME 234 queries the HSS 246 to determine whether the SPS 248 has stored a packet gateway identifier associated with the mobile device 216. Typically, the packet gateway identifier will be stored in the SPS 248 once the mobile device 216 first attaches to the network. However, in some instances, the packet gateway identifier is removed or otherwise deleted from the SPS 248 for reasons sometimes unknown. In these circumstances, the MME 234 will receive an error from the HSS 246, indicating that the packet gateway identifier is not stored in the SPS 248 for that particular mobile device 216. The mobile device 216 will then be denied access to the 4G LTE network and falls back to 3G eHRPD. At this time, a Proxy Mobile IPv6 (PMIP) handover in the form of a binding update is sent from the HSGW 224 to the PDN gateway 238, which triggers the PDN gateway 238 to communicate an authorization request to the AAA 244. While typically the PDN gateway 238 does not communicate an authorization request to the AAA 244 as the mobile device is already attached to the 3G eHRPD network and merely accepts the binding update from the HSGW 224 and establishes binding on the 3G network, herein, the PDN gateway 238 communicates an authorization request to the AAA 244 every time it receives the binding update. The PDN gateway 238 conventionally only sends an authorization request when it receives the binding update of an initial attach/handoff for the first time for a session from the HSGW 224. As such, when a duplicate binding update for an initial attach/handoff is received by the PDN gateway 238 for an already-attached eHRPD call, the PDN gateway 238 would not typically send an authorization request to the AAA 244, as the call is already attached. However, in embodiments described herein, the PDN gateway 238 does send an authorization request to the AAA 244 each time it receives a binding update from the HSGW 224. Because the authorization request includes the packet gateway identifier, the packet gateway identifier is ensured to be stored in the SPS 248 when the mobile device 216 attempts to handoff to the 4G LTE network. As used herein, a binding update is a PMIP signaling packet that indicates a new mobile device joining the network.

In one embodiment, a mobile device is authenticated onto a 3G network. It is then determined that the mobile device has made a first handoff attempt to access the 4G network. The subscriber profile database is accessed to determine whether a packet gateway identifier associated with the mobile device is stored on the database. Upon determining that the identifier is not stored on the database, the mobile device is denied access to the 4G network. Once denied, the mobile device 216 again falls back to 3G eHRPD, which causes the HSGW 224 to trigger a Proxy Mobile IPv6 (PMIP) handover in the form of a Proxy Binding Update (PBU), which in turn triggers an authorization request (e.g., AAR) to the AAA 244. The authorization request includes the identifier, which is forwarded to the SPS 248 from the AAA 244 via the HSS 246. The packet gateway identifier is stored on the subscriber profile database. It is determined that the mobile device is making a second handoff attempt to access the 4G network. The second handoff attempt can be authorized, as the packet gateway identifier is now stored on the database.

Another embodiment includes an indication being received that a mobile device is unable to transition from a 3G eHRPD network to a 4G LTE network based, at least in part, on a subscriber profile database not having stored a packet gateway identifier associated with the mobile device's current communications session. Upon being denied, an authorization request (e.g., AAR) is sent from the PDN Gateway 238 to the AAA 244, which forwards the packet gateway identifier to the SPS 248 by way of the HSS 246. In one embodiment, the AAR includes MIP6 Agent Information, which includes the packet gateway identifier. The mobile device is then allowed to transition from the 3G eHRPD network to the 4G LTE network.

In yet another embodiment, upon determining that a mobile device involved in an existing communications session on a 3G network is attempting to access a 4G network, a subscriber profile database is accessed to determine that it does not have stored a packet gateway identifier. The mobile device is denied access to the 4G network. A packet gateway, such as a PGW, receives a binding update, which triggers the packet gateway to communicate an authorization request to the AAA. The authorization request is communicated to the subscriber profile database by way of the AAA and HSS. The authorization request includes the packet gateway identifier. After the mobile device makes a subsequent attempt to access the 4G network, the mobile device is allowed access to the 4G network based on the subscriber profile database having stored the packet gateway identifier associated with the mobile device.

Figure 3:
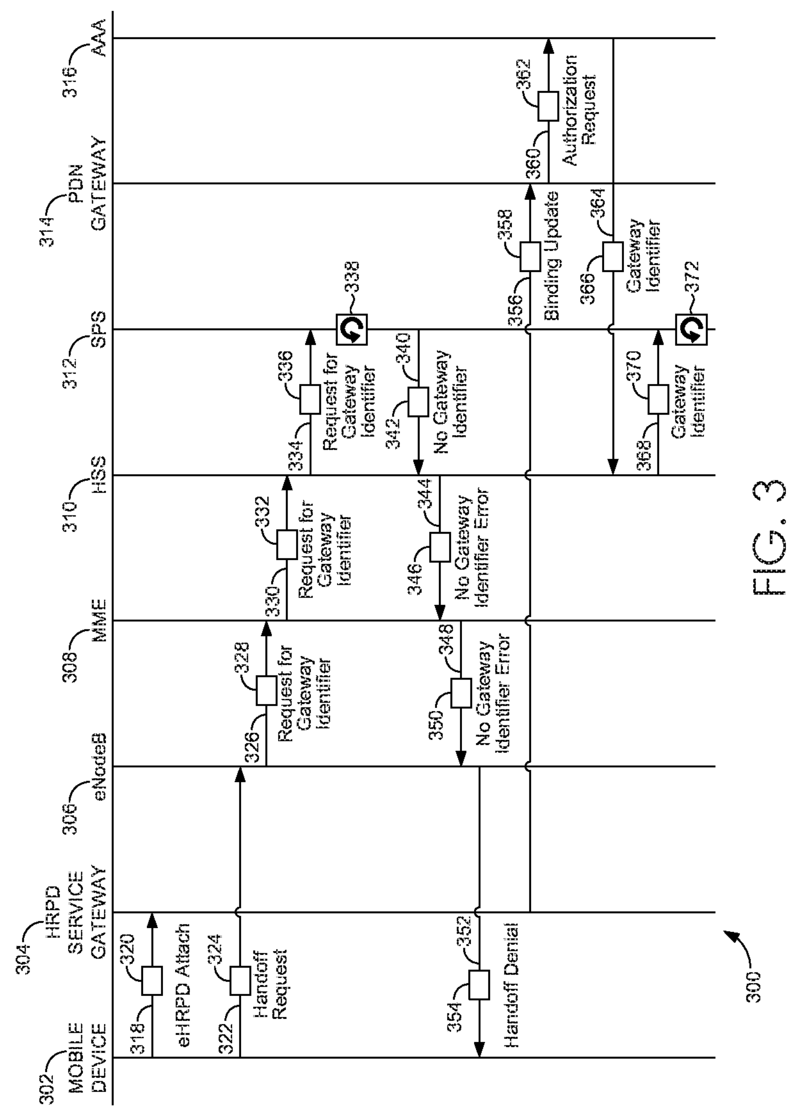
FIG. 3 depicts a flow diagram of a method for optimizing a transition of a mobile device from a 3G network to a 4G network, in accordance with an embodiment of the present invention.

Turning now to FIG. 3, a flow diagram is illustrated of a method 300 for optimizing a transition of a mobile device from a 3G network to a 4G network, in accordance with embodiments of the present invention. Initially, the components illustrated in FIG. 3 include a mobile device 302, an HRPD Service Gateway (HSGW) 304, an eNodeB 306, an MME 308, an HSS 310, an SPS 312, a PDN Gateway (PGW) 314, and an AAA server 316. In one embodiment, the PGW 314 is the only component in FIG. 3 that is common to both the 3G eHRPD network and the 4G LTE network. For instance, the HSGW 304 is a 3G eHRPD component, and the other components are 4G LTE components. The mobile device 302 initially communicates 318 an eHRPD attach 320 to the HRPD Service Gateway (HSGW) 304. The eHRPD attach may include an authentication request for the mobile device 302 to attach to the eHRPD network, such as when the mobile device 302 is first attaching to the network. The HSGW 304 processes the authentication request 316. Once the mobile device 302 indicates a desire to handoff or transition from a 3G network to a 4G network, the mobile device 302 communicates 322 a handoff request 324 to the eNodeB 306. The mobile device 302 may scan for an LTE or other signal while still attached to the 3G network, and if it finds an LTE signal, may indicate its desire to handoff to the 4G network. As mentioned herein, in an LTE network, the eNodeB functions as a base station. The eNodeB 306, as a result of the handoff request 324, communicates 326 a request for a packet gateway identifier 328 to the MME 308, which forwards 330 the request 332 to the HSS 310. The mobile device 302 is unable to transition from a 3G network to a 4G network without the network components knowing the packet gateway identifier so that the network knows which packet gateway is associated with the mobile device. The HSS 310 queries 334 the SPS 312 for the gateway identifier 336. At step 338, the querying or searching of the SPS 312 is performed. In the embodiment of FIG. 3, the SPS 312 does not have stored the packet gateway identifier, as it may have been removed or otherwise deleted for some reason. As such, the HSS 310 receives 340 no gateway identifier 342. The HSS 310 communicates 344 an error message, or a no gateway identifier error 346 to the MME 308, which forwards 348 the no gateway identifier error 350 to the eNodeB 306, indicating to the eNodeB 306 that the packet gateway identifier associated with the mobile device 302 is not available. The mobile device 302 receives 352 a handoff denial 354, indicating that the handoff to the 4G network was unsuccessful.

In response to the packet gateway identifier not being stored or present on the SPS 312, the HSGW 304 communicates 356 a binding update 358 to the PGW 314. As mentioned, the binding update may be a proxy binding update. As used herein, a proxy binding update is a request message sent by a mobile access gateway to a mobile device's local mobility anchor for establishing a binding between the mobile device's home network prefix assigned to a given interface of a mobile node and its current care-of address. The PGW 314 is then triggered, by way of the binding update 358, to communicate 360 an authorization request 362 (e.g., AAR) with the packet gateway identifier to the AAA 316. In one embodiment, the authorization request is an AAR that includes MIP6 Agent Information, including the packet gateway identification. In one embodiment, the MIP6 Agent Information includes an attribute value pair, which indicates the packet gateway identifier and other information in some embodiments. The AAA 316 forwards 364 the packet gateway identifier 366 to the HSS 310, which forwards 368 the packet gateway identifier 370 to the SPS 312 so that it can be stored. As such, the next time that the mobile device 302 attempts to handoff to the 4G LTE network, the SPS 312 will be able to retrieve the packet gateway identifier associated with the mobile device 302 and the mobile device 302 will be allowed to access the 4G LTE network. Various terms, including transition and handoff, are used interchangeably in this application to refer to a mobile device moving from a first network to a second network (e.g., 3G network to 4G network). All are meant to convey the mobile device moving to a different network.

Figure 4:
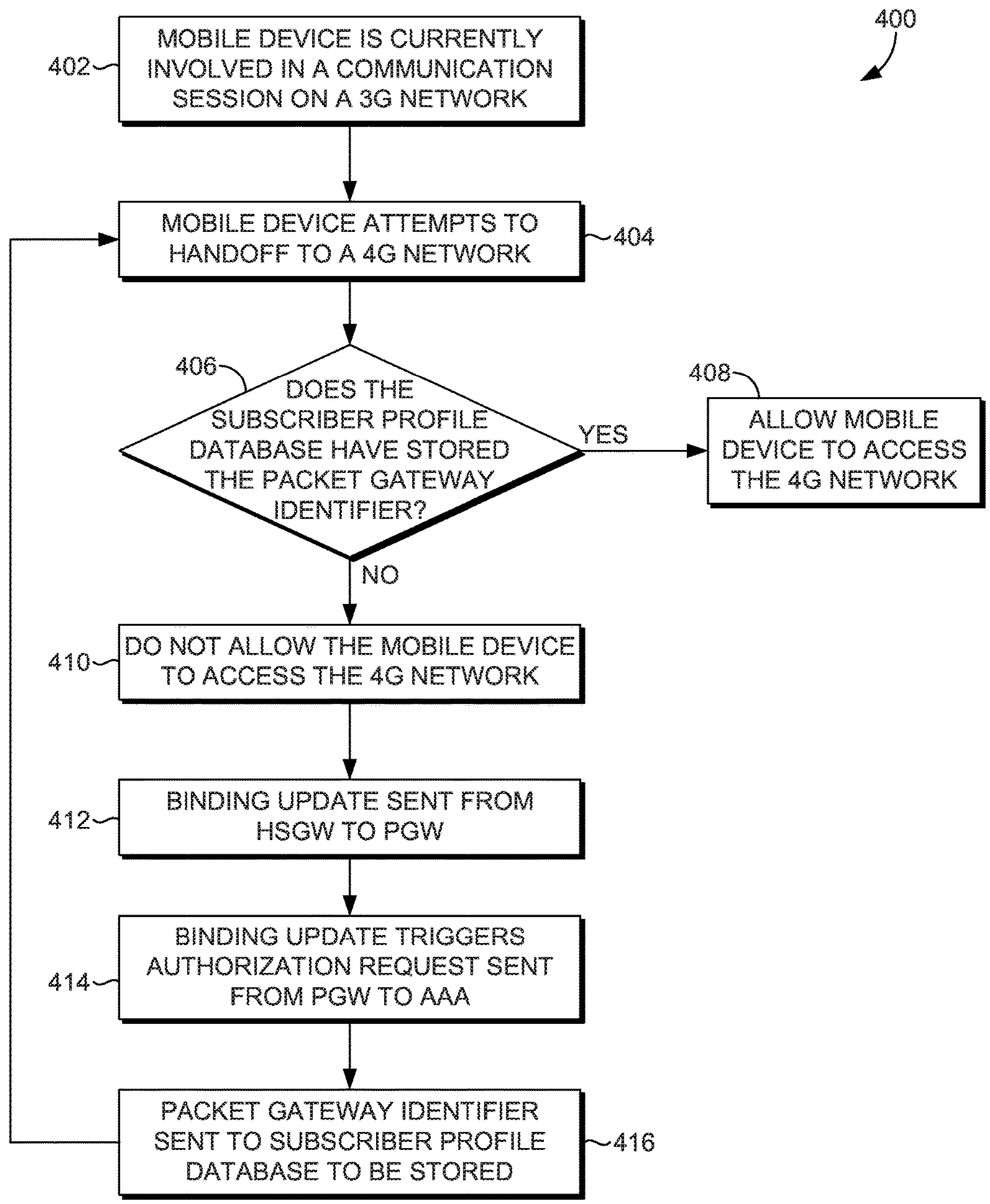
FIG. 4 depicts a flow chart of a method for optimizing a transition of a mobile device from a 3G network to a 4G network, in accordance with an embodiment of the present invention.

Referring now to FIG. 4, a flow chart of a method 400 is shown for optimizing a transition of a mobile device from a 3G network to a 4G network, in accordance with embodiments of the present invention. Initially at block 402, the mobile device is currently involved in a communication session in a 3G network. For instance, the mobile device may have made an initial attachment to the 3G network using, for example, eHRPD. At block 404, the mobile device attempts to transition or handoff to a 4G network, which in one embodiment utilized LTE technology. It is determined at block 406 whether the subscriber profile database has stored a packet gateway identifier associated with the mobile device. As mentioned, the packet gateway identifier is initially stored on the subscriber profile database when the mobile device initially attached to the network. However, for some unknown reasons, the packet gateway identifier may be removed or deleted from the database in some instances. If the packet gateway identifier is currently stored in the subscriber profile database, block 408 indicates that the mobile device is allowed to handoff to and access the 4G network. However, if the packet gateway identifier is not currently stored in the subscriber profile database, block 410 indicates that the mobile device is not allowed to handoff to and access the 4G network.

When the mobile device comes back down to the 3G network after being denied, a binding update, such as a proxy binding update with PMIP of handover, is sent from the HSGW to the PGW at block 412. The binding update triggers the PGW to send an authorization request to the AAA, shown at block 414. The authorization request includes the packet gateway identifier. As such, at block 416, the packet gateway identifier is forwarded to the subscriber profile database to be stored. Next time the mobile device attempts to access the 4G network, the subscriber profile database will have stored the packet gateway identifier associated with the mobile device, and therefore the mobile device will be granted access to the 4G network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for optimizing a seamless transition of a mobile device from a 3G network to a 4G network in a failure scenario, the method comprising:

determining that the mobile device is initiating a first handoff attempt to access the 4G network;

accessing a subscriber profile database to determine that a packet gateway identifier associated with the mobile device is not stored on the subscriber profile database;

based on the packet gateway identifier not being stored on the subscriber profile database, denying the first handoff attempt by the mobile device to access the 4G network; and based on the first handoff attempt being denied, triggering an authorization request that comprises the packet gateway identifier associated with the mobile device, the packet gateway identifier being forwarded to the subscriber profile database.

2. The method of claim 1, further comprising, prior to accessing the subscriber profile database, authenticating the mobile device to the 3G network.

3. The method of claim 1, the determining that the mobile device is initiating the first handoff attempt to access the 4G network is accomplished at a network component.

4. The method of claim 1, further comprising storing, on the subscriber profile database, the packet gateway identifier that is forwarded to the subscriber profile database.

5. The method of claim 1, further comprising authorizing a second handoff attempt of the mobile device to access the 4G network based on the packet gateway identifier associated with the mobile device being stored on the subscriber profile database.

6. The method of claim 1, wherein the 3G network is a 3G Enhanced High Rate Packet Data (eHRPD) network.

7. The method of claim 1, wherein the 4G network is a Long Term Evolution (LTE) 4G network.

8. The method of claim 1, wherein the authorization request, comprising the packet gateway identifier, is triggered by a binding update sent from a serving gateway in the 3G eHRPD network to a packet gateway in the 4G network.

9. The method of claim 1, wherein the authorization request in communicated to an authentication server which forwards the packet gateway identifier to the subscriber profile database by way of an HSS.

10. The method of claim 1, wherein the authorization request is an authorized authenticate request that is communicated from a packet gateway to an authentication server.

11. The method of claim 10, wherein the packet gateway identifier that is contained in the authorization request is communicated from the authentication server to the subscriber profile database such that the packet gateway identifier from the authorization request can be stored on the subscriber profile database.

12. The method of claim 1, wherein the mobile device is unable to handoff to the 4G network unless the packet gateway identifier associated with the mobile device is stored in and is retrievable from the subscriber profile database.

13. The method of claim 1, further comprising initiating a handoff of the mobile device from the 3G network to the 4G network based on the authorization of the mobile device to handoff to and access the 4G network.

14. A method for optimizing a seamless transition of a mobile device from a first network to a second network in a failure scenario, the method comprising:

receiving a handoff failure indication, wherein the handoff failure indication is an indication that the mobile device is unable to transition from a first network to a second network based, at least in part, on a subscriber profile database in the second network not having stored a packet gateway identifier associated with a current communication session for the mobile device; and based on the handoff failure indication, communicating, at a packet gateway, an authorization request that comprises the packet gateway identifier associated with the current communication session for the mobile device, the packet gateway identifier being communicated to the subscriber profile database.

15. The method of claim 14, further comprising, after the packet gateway identifier being communicated to the subscriber profile database, allowing the mobile device to transition from the first network to the second network.

16. The method of claim 14, wherein the mobile device is unable to transition to the second network unless the packet gateway identifier associated with the mobile device is stored in and is retrievable from the subscriber profile database.

17. The method of claim 14, wherein the authorization request is triggered by a proxy binding update sent from a serving gateway in the first network to a packet gateway in the second network.

18. A non-transitory computer-readable media having computer-executable instructions embodied thereon that, when executed, perform a method for optimizing a transition of a mobile device from a non-LTE network to an LTE network in a failure scenario, the method comprising:

determining that a packet gateway identifier associated with the mobile device is not currently stored in a subscriber profile database;

upon determining the packet gateway identifier is not stored in the subscriber profile database, denying the mobile device access to the LTE network;

receiving at a packet gateway a binding update, the binding update triggering the packet gateway to communicate an authorization request; and at the packet gateway, communicating the authorization request that comprises the packet gateway identifier associated with the mobile device such that the packet gateway identifier is forwarded to and stored on the subscriber profile database.

19. The media of claim 18, further comprising, after a subsequent handoff attempt by the mobile device involved in the current communication session for the mobile device on the non-LTE network to access the LTE network, allowing the mobile device to access the LTE network based on the subscriber profile database having stored the packet gateway identifier associated with the mobile device.

20. The media of claim 19, wherein the mobile device is unable to transition to the LTE network unless the packet gateway identifier associated with the mobile device is stored in and is retrievable from the subscriber profile database.

* * * * *